US011673446B2

United States Patent
Friedl

(10) Patent No.: US 11,673,446 B2
(45) Date of Patent: Jun. 13, 2023

(54) PNEUMATICALLY ACTUATED ADJUSTING DEVICE FOR ACTING ON A SPRING DEVICE OF A SPRING DAMPER COMPRISING A TUBULAR BODY

(71) Applicant: KTM AG, Mattighofen (AT)

(72) Inventor: Eduard Friedl, Schalchen (AT)

(73) Assignee: KTM AG, Mattighofen (AT)

( * ) Notice: Subject to any disclaimer, the term of this patent is extended or adjusted under 35 U.S.C. 154(b) by 415 days.

(21) Appl. No.: 16/898,968

(22) Filed: Jun. 11, 2020

(65) Prior Publication Data

US 2021/0016621 A1 Jan. 21, 2021

(30) Foreign Application Priority Data

Jul. 17, 2019 (DE) ...................... 10 2019 119 419.9

(51) Int. Cl.
*B60G 17/027* (2006.01)
*B60G 15/06* (2006.01)

(52) U.S. Cl.
CPC ....... *B60G 17/0272* (2013.01); *B60G 15/062* (2013.01); *B60G 2202/312* (2013.01); *B60G 2202/412* (2013.01); *B60G 2204/4404* (2013.01); *B60G 2206/41* (2013.01); *B60G 2300/07* (2013.01); *B60G 2300/12* (2013.01)

(58) Field of Classification Search
CPC .............. B60G 17/0272; B60G 15/062; B60G 2202/312; B60G 2202/412; B60G 2204/4404; B60G 2206/41; B60G 2300/07; B60G 2300/12; B60G 15/063; B60G 2204/1242; B60G 2204/61;
(Continued)

(56) References Cited

U.S. PATENT DOCUMENTS 4,667,941 A 5/1987 Hatashi et al.
5,454,550 A * 10/1995 Christopherson .... B60G 15/062
267/221
(Continued)

FOREIGN PATENT DOCUMENTS

CN 104838166 A * 8/2015 ......... B60G 17/0272
DE 44 38 756 A1 6/1995
(Continued)

*Primary Examiner* — Drew J Brown
(74) *Attorney, Agent, or Firm* — Rod D. Baker

(57) ABSTRACT

A pneumatically operable adjusting device (1) is provided for acting on a spring device (5) of a spring damper device (3) having a tubular body (2), with a tubular piece-shaped housing (4) which is designed to surround the tubular body (2) and has a passage (6) passing through a peripheral wall of the housing (4), and the adjusting device (1) has an adjusting nut (9) with an internal thread (10) which is attached to an external thread (11) of a tubular body (2), 37) of the spring damper device (3) can be brought into screw engagement, the housing (4) being designed for releasable abutment against the adjusting nut (9) and having an inner recess (7) for forming a pressure chamber (8) which is in fluid connection with the passage (6) and the inner recess (7) forming a pressure wall (24), the fluid admission of which causes a force acting on the housing (4) in the axial longitudinal direction and the housing (4) has an abutment surface (54) designed for spring force admission by the spring device.

11 Claims, 8 Drawing Sheets

(58) Field of Classification Search
CPC .............. B60G 2500/22; B60G 17/021; B62K 2025/048; F16F 9/56
See application file for complete search history.

(56) References Cited

U.S. PATENT DOCUMENTS

| | | | |
|---|---|---|---|
| 10,118,455 B1* | 11/2018 | Lambert | ............... B60G 15/063 |
| 2009/0230640 A1* | 9/2009 | Michel | ............... B60G 17/0157 |
| | | | 280/6.157 |
| 2010/0308518 A1* | 12/2010 | Michel | ................ B60G 15/068 |
| | | | 267/225 |
| 2016/0153517 A1* | 6/2016 | Lizarraga Senar | ..... F16F 9/516 |
| | | | 267/226 |
| 2016/0159191 A1* | 6/2016 | Seminara | ............. B60G 15/063 |
| | | | 267/218 |
| 2017/0057315 A1* | 3/2017 | Rutherford | ............ B60G 17/08 |
| 2019/0030974 A1 | 1/2019 | Yang et al. | |
| 2020/0384822 A1* | 12/2020 | Bruno | ................. B60G 17/015 |

FOREIGN PATENT DOCUMENTS

| | | | | |
|---|---|---|---|---|
| DE | 10 2013 102591 A1 | 3/2014 | | |
| DE | 112018007379 T5 * | 12/2020 | ........... | B60G 11/265 |
| EP | 2 862 734 A1 | 4/2015 | | |
| JP | S58 53942 U | 4/1983 | | |
| JP | S58 165353 U | 11/1983 | | |
| JP | S63 106931 U | 7/1988 | | |
| JP | S63 106932 U | 7/1988 | | |
| JP | H03 117738 A | 5/1991 | | |
| JP | 2005 121060 A | 5/2005 | | |

\* cited by examiner

PNEUMATICALLY ACTUATED ADJUSTING DEVICE FOR ACTING ON A SPRING DEVICE OF A SPRING DAMPER COMPRISING A TUBULAR BODY

CROSS-REFERENCE TO RELATED APPLICATIONS

This application claims priority to German Patent Application No. DE 10 2019 119 419.9, filed 17 Jul. 2019, the contents of which are incorporated herein by reference.

BACKGROUND OF THE INVENTION

Field of the Invention

The present invention relates spring dampers, particularly to a pneumatically operable adjusting device for acting on the spring device of a spring damper device having a tubular body. The adjusting device according to the invention can be used to change the suspension characteristics of a spring device of a spring damper device in, for example, a motorcycle.

Background Art

A spring damper device, such as may be used on a motorcycle, usually has a tubular body which has a damping device inside by means of which movements of the structure of the motorcycle can be damped. The tubular body is usually surrounded by a spring device, i.e., a main spring, ordinarily in the form of a helical compression spring, which simultaneously acts as the main spring of the spring damper device.

The spring behavior of the main spring can be influenced by changing the preload of the spring device, whereby the main spring is preloaded more or less strongly for this purpose. A change in the preload is carried out by means of an adjusting nut which can be displaced axially relative to the tube body at an external thread of the tube body, and which is pressurized by the main spring.

If the main spring is to be preloaded more strongly, the adjusting nut is displaced relative to the tube body to preload the main spring. If the main spring exerts a compressive force on the adjusting nut during the displacement movement of the adjusting nut, high actuating forces are required to rotate the adjusting nut on the external thread of the tube body. These high pressure forces naturally also lead to a high load on the external thread of the tube body, and on the engaging internal thread of the adjusting nut, so that the engaged threads of the tube body and nut are subject to high load and wear. Additionally, there is a risk of contamination in the area of the thread of the adjusting nut, which increases the risk of thread damage to the point of inoperability.

To mitigate or eliminate these problems, it has been known to facilitate the turning operation of the adjusting nut by relieving the pressure force on the adjusting nut (for the time interval of the nut turning operation) by preloading the main spring with an adjusting device in the form of a preload adjuster. With the preload adjuster in operation, the adjusting nut can be easily turned on the thread of the tube body, as the adjusting nut is no longer subjected to the pressure force of the main spring.

Based on German Publication DE 10 2016 213 429 A1 a spring and damping arrangement for a motorcycle is known, which has a preload adjuster in the form of a hydraulic actuator. The actuator can be filled with more or less hydraulic fluid in order to influence the effective spring length of the main spring of this known arrangement.

A shock absorber with pressure-supported adjustment is known on the basis of European Patent App. Publication EP 1 781 475 B1, which has an electro-hydraulic preload adjuster which has a housing in which a hydraulically actuated piston is arranged, which is acted upon by the main spring. By the hydraulic actuation of the piston, an axial displacement of the piston can be brought about in order to influence the spring behavior of the main spring.

Finally, a pneumatically actuated spring preloader or preload adjuster from Öhlins Racing AB has become known. This preload adjuster has a housing in which a piston is axially displaceably arranged, which can be actuated by pressurization with compressed air. The spring preloader has a spring support against which the main spring rests. An axial displacement of the annular piston, which has sealing devices in the form of O-rings on both the inner and outer circumference, results in a pressurization of the main spring, so that during the pressurization of the piston the main spring is released from the pressure force exerted on an adjusting nut of the known spring pretensioner; the adjusting nut then can be rotated on the tube body and thus axially displaced. This well-known spring pretensioner has a large number of components, which on the one hand increase its manufacturing costs and on the other hand increase its susceptibility to errors.

The presently disclosed invention is based on the task of providing a pneumatically actuated adjusting device for acting on a spring device of a spring damper device having a tubular body, which adjusting device can be easily manufactured and can be operated in a fail-safe manner to eliminate the disadvantages described above. In addition, a spring damper device should also be provided which is characterized by the aforementioned adjusting device.

SUMMARY OF THE INVENTION

There is provided a pneumatically operable adjusting device for acting on the spring of a spring damper. The spring damper means has a tube body, and a tubular shaped housing designed to surround the tube body, there being a passage passing through a peripheral wall of the housing. The adjusting device has an adjusting nut with an internal thread which can be brought into screwed engagement with an external thread on the tube body of the spring damper means. The housing is adapted for detachable abutment against the adjusting nut, and has an internal recess forming a pressure chamber that is in fluid communication with the passage through the housing wall. The internal recess also forms a pressure wall, the fluid admission or application of which causes a force acting on the housing in the axial longitudinal direction; the housing has an abutment surface designed for spring force admission or application by the main spring.

The adjusting device according to the invention is characterized, among other things, by the fact that—in contrast to known adjusting devices or preload adjusters—it does not have a separate piston which has to be manufactured independently and would then be present as a separate component in the adjusting device. As mentioned herein above, such separate piston components disadvantageously must have sealing devices on both the inner and outer circumferences, in order to seal against the housing containing the piston on the one hand and also against the tube body of the spring damper device on the other hand. Due to the omission of the separate piston alone, the adjustment device according to the present invention has a significant advantage over the known adjustment devices or preload adjusters. The tubular shaped housing can be the tubular body or another tubular piece-shaped body of the adjusting device.

The invention exhibits the features indicated in claim 1 for solving this problem with regard to the adjusting device. Advantageous designs of the adjusting device are described in the further claims. The invention also exhibits the features indicated in the claims with respect to the spring damper device.

BRIEF DESCRIPTION OF THE SEVERAL VIEWS OF THE DRAWING

The invention is explained in more detail below on the basis of the drawing. This drawing shows, in the various views.

DETAILED DESCRIPTION OF THE INVENTION

Figure 1:
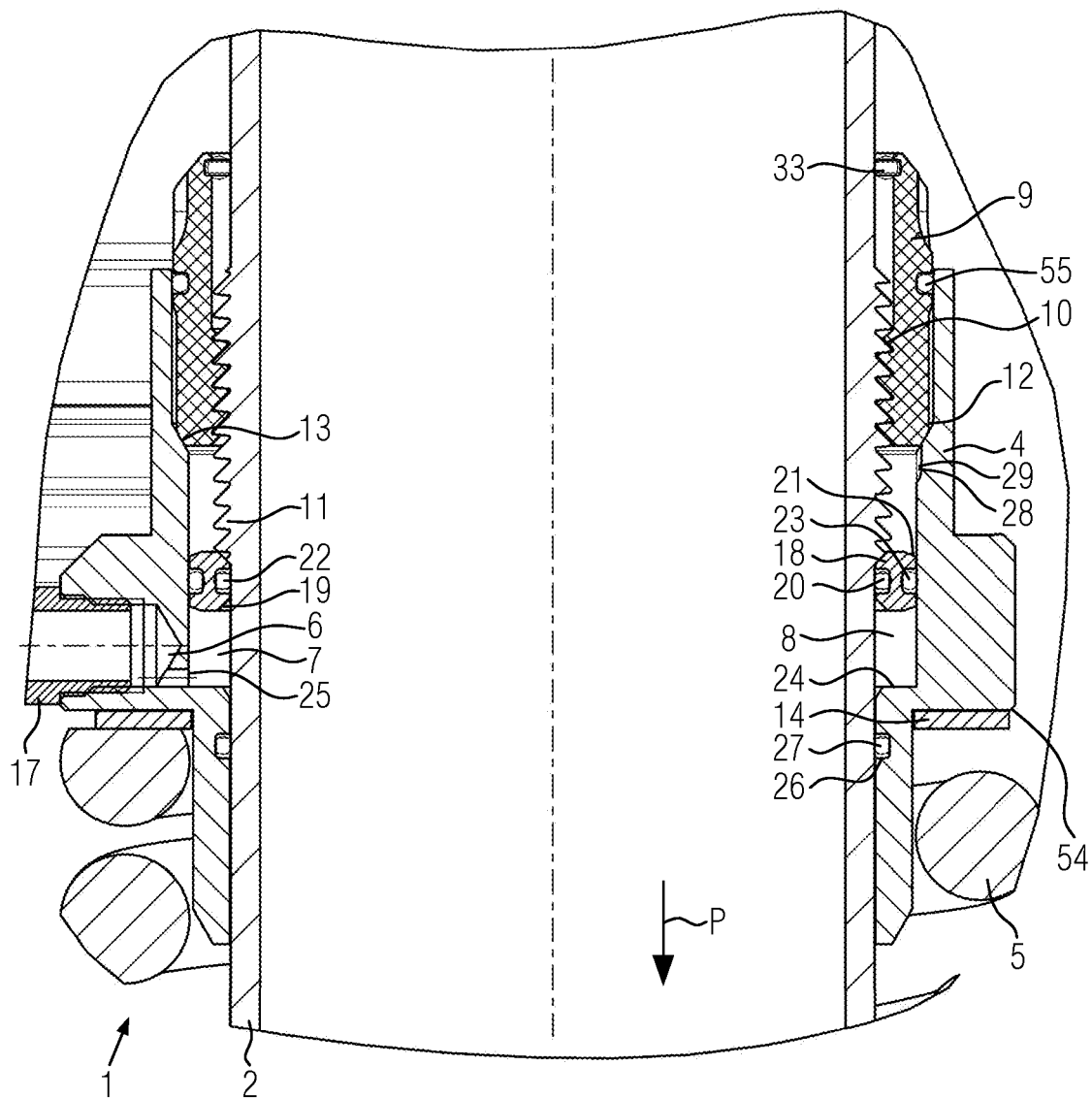
FIG. 1 is a sectional view of the pneumatically operated adjusting device according to a first embodiment of the present invention.

The following description is of a pneumatically operable adjusting device for acting on the spring of a spring damper means. The spring damper has a tube body, and a tubular shaped housing designed to surround the tube body, there being a passage passing through a peripheral wall of the housing. The adjusting device has an adjusting nut with an internal thread which can be brought into screwed engagement with an external thread on the tube body of the spring damper means. The housing is adapted for detachable abutment against the adjusting nut, and has an internal recess forming a pressure chamber that is in fluid communication with the passage through the housing wall. The internal recess also has a pressure wall, the application of pressure against which causes a force acting on the housing in the axial longitudinal direction; the housing has an abutment surface designed for to receive spring force applied by the main spring.

The present adjusting apparatus is contrasted with known devices, because, among other things, it does not have a separate piston which has to be manufactured independently, and would be a separate component in the adjusting device. Such separate piston components disadvantageously must have sealing devices on both the inner and outer circumferences, in order to seal against the housing containing the piston on the one hand and also against the tube body of the spring damper device on the other hand. Due to this lack of a separate piston, the present adjustment device offers a significant advantage over known adjustment devices. The tubular shaped housing can be the tubular body or another tubular piece-shaped body of the adjusting device, as will be explained in more detail below.

The adjusting device has a housing with a pressure wall which, by means of fluid pressurization (with, for example, compressed air) forms a force for pressurizing the spring to be compressed. The adjusting nut consequently then is free from pressurization by the main spring, and can be displaced on the tube body without great effort by bringing about a screw movement between the internal thread of the adjusting nut and the external thread of the tube body. The nut can be displaced, for example, in the direction of the spring compressed by means of the pressure wall, so that a subsequent relaxation of the pressure chamber of the adjusting device results in the main spring then resting again against an abutment surface of the adjusting device (but, for example, in a more pretensioned state than before the displacement of the adjusting nut).

If the spring is to be displaced by means of a pressure force acting on the pressure wall, this will also lead to this, in that the housing of the adjusting device, which has the pressure wall, is released from its detachable contact position on the adjusting nut; the adjusting nut is therefore also no longer acted upon by the spring force or reaction force of the main spring, and therefore there is also no longer any surface pressure, caused by the spring force, between the threads of the internal thread of the adjusting nut and the external thread of the tube body. The adjusting nut can therefore be screwed, i.e. axially displaced, relative to the tube body with a relatively small amount of force.

When the pressure force on the pressure wall is released to restore the operating position of the spring damper device, the force of the main spring causes an axial displacement of the housing accommodating the pressure wall relative to the tube body, and causes the housing to rest against the adjusting nut. The spring force is thus supported on the adjusting nut via the abutment surface of the housing, against which the spring rests, and thus also on the tube body of the spring damper device via a contact surface formed between the adjusting nut and the housing. However, during the adjustment movement of the adjusting nut relative to the tube body, the adjusting nut is relieved of spring force. The adjusting nut can be easily operated by the user of a vehicle equipped with the spring damper device, without the need for large force or tools.

According to an aspect of the apparatus, the tubular housing is designed for axial displacement, on the tube body, against the spring force of the main spring. This configuration has the advantage that the spring is supported on the housing, which also leads to the displacement of the spring when pressure is applied to the pressure chamber, for example by applying compressed air to the pressure wall via the passage passing through the housing. This is accomplished without the need for a separate piston which is axially displaceable relative to the housing, the application and displacement of which ultimately leads to the application of pressure to the spring, as is the case with the known spring pretensioners.

The adjusting device may optionally include a spring washer which can be brought into contact with the abutment surface of the housing, and has a surface that is adapted to be subjected to compressive force by the main spring. An advantage of this configuration is that the housing can be manufactured at low cost, for example using an aluminum alloy, because the last or uppermost thread or portion of the spring (which applies high surface pressures) does not directly abut the abutment surface of the housing. But the upper portion of the spring can be replaced easily on the spring washer, designed as an intermediate ring. The spring washer can be replaced easily if this is necessary, for example due to wear, and if such a wear pattern is present, there is no need to replace the entire housing of the adjusting device.

Also according to the apparatus, the housing preferably has a conical shoulder on an inner recess which can be brought into contact with the adjusting nut, and the shoulder applies a radially inwardly acting clamping force to at least one region of the adjusting nut for its releasable engagement to the tube body. If the housing becomes detached from the adjusting nut when the pressure wall is pressurized with, for example, compressed air, then the conical shoulder of the housing is also disengaged from the adjusting nut, and the adjusting nut can be turned without much effort on the tube body (which typically is the tube body of the spring damper device, for example). If the compressed air is then released from the pressure chamber, the main spring moves the housing in the direction of the adjusting nut, and the conical shoulder of the housing comes into contact with the adjusting nut. Via the conical shoulder of the housing and a complementarily formed contact surface in the form of a conical shoulder on the adjusting nut, a pressure force thus is applied to the contact surface of the adjusting nut in a radially inward direction. In this manner, a clamping force is formed between the adjusting nut and the tube body, whereby positional stability and reliable clamping of the adjusting nut relative to the tube body is achieved. This advantageously prevents the adjusting nut from loosening uncontrollably, even if the spring damper device is subjected to shock loads, for example when the vehicle equipped with the adjusting device is traveling on rough terrain. Such shock loads can occur, for example, if a spring damper device provided with the presently disclosed adjusting device is used on an off-road motorcycle.

The adjusting device preferably has means for at least sectionally forming the pressure chamber, which include the pressure wall. Other means or devices may be components designed to form the pressure chamber. For example, the chamber forming agent may be a sealing device which fits against the body of the tube so that the agent provides part of the pressure chamber. The means may also be, for example, a sealing means located on a sleeve surrounding the tube body of the spring damper means. Thus, the sealing device forms a part of the pressure chamber.

The adjuster device preferably has at least one expansion device, including a vent, which can be brought into fluid communication with the pressure chamber by moving the housing relative to the tube body. This displacement can, for example, be an axial displacement or a displacement caused by a rotary actuation of the housing relative to the tube body. The displacement results in the fact that a relief device of the housing, preferably configured as a venting slot, can be brought into fluid communication with the pressure chamber so that internal air pressure can escape from the pressure chamber via the relief device, or the pressure can be reduced.

A pressure build-up in the pressure chamber leads to an impact on a pressure wall of the pressure chamber, and this impact causes an axial displacement (e.g., via the housing) of the main spring. By providing the expansion device, it is achieved that after the predetermined displacement of the housing relative to the tube body, a further displacement of the housing no longer takes place. This is because such a further displacement of the housing—due to a further pressurization of the pressure chamber, for example by the user of the adjusting device—causes the expansion device to come into fluid communication with the pressure chamber, and thereby preventing a further increase of the pressure in the pressure chamber. This has the advantage that the traveling path achievable by the user is limited according to the technical specifications, and damage to components due to overpressure or improper travel can be prevented.

The adjusting device preferably has an annular body provided adjacent an inner recess, which is designed to surround the tube body of the spring damper device. The annular body has grooves of largely U-shaped design on the inner circumference as well as on the outer circumference thereof for receiving sealing devices; this annular body delimits a pressure chamber amongst an inner circumferential wall of the housing, and the pressure wall, as well as the outer circumferential wall of the tube body. This configuration ensures that sealing devices of the adjusting device can be held in place by the annular body. The annular body may be configured to serve like a closure ring, for example, which on the one hand rests against the outer circumferential wall of the tube body and on the other hand also rests against the inner circumferential wall of the housing, so that the pressure chamber is sealed via the sealing devices relative to both the tubular body and to the housing. In this way, the pressure wall and the outer circumferential wall of the tube body, together with the annular body and the sealing devices, delimit the pressure chamber of the adjusting device.

According to another aspect of the adjuster apparatus, the housing preferably has a groove, of generally U-shape, in the vicinity of the pressure wall for receiving a sealing device, which is supported on a region of the tube body that does not have an external thread. The housing also may have a further sealing device on a region spaced apart from the groove in the axial longitudinal direction, which is supported on an outer peripheral region of the tube body, and the pressure chamber is defined by the housing, the sealing devices, and the tubular body. This configuration ensures that, compared to known preload adjusters, not only is the piston for loading the main spring no longer required, but also an annular body which seals the pressure chamber with sealing devices is no longer needed. A further functional integration is achieved, in that sealing devices for sealing the pressure chamber are performed by other components of the adjusting device. A separate carrier element for taking up the seals is no longer required.

The adjusting apparatus may have, in an alternative embodiment, a tubular body defining an adapter sleeve disposable between the housing and the tube body of the spring damper. The adapter sleeve has, at least along a partial region of its longitudinal extension, an internal thread which can be brought into releasable engagement with the external thread of the tube body, and the adjusting device has a clamping nut which can be arranged in releasable engagement with the housing for its releasable axially fixed and rotationally fixed arrangement on the tube body of the spring damper device. This embodiment offers an advantage that the adapter sleeve is designed to accommodate the locknut and therefore the locknut is not in direct threaded engagement with the tube body. The tubular body can therefore be used as an intermediate sleeve or adapter sleeve, which has an internal thread on its inner circumference that engages with the external thread of the tubular body. This embodiment also has the advantage that the adjusting device can be used on different and differently designed spring damper devices, and that the adapter sleeve can also be arranged on already existing spring damper devices, since it only has to be ensured that the tubular adapter sleeve with its internal thread is compatible with the external thread of the spring damper device. Accordingly, the adjusting device according to the invention can also be used as an aftermarket component or accessory component. Therefore, by means of the adapter sleeve, the adjusting device according to the invention can be arranged at different positions of different thread types of existing spring damper devices, so that the adjusting device is suitable for the further training of different types of suspension struts.

A sealing device preferably is provided in the area between the housing and the adjusting nut, and another sealing device is provided in the area between the adjusting nut and the tube body. By means of these sealing devices the further advantage of the adjusting device according to the invention is achieved that the penetration of dirt into the thread area between the internal thread of the adjusting nut and the external thread of the tube body is prevented. This configuration thus helps to ensure that no debris, in the form of dust or the like, can enter the threaded area. With the threads maintained in a clean condition, the adjusting nut can always be screwed freely onto the tube body, which is particularly advantageous when the adjusting device is used on a spring damper device for an off-road motorcycle.

Similarly, it is also is preferred that a sealing device is arranged in the area between the tube body and the adapter sleeve, and a sealing device is arranged in the area between the clamping nut and the housing. Thus, even with the alternative embodiment of the adjusting device, the penetration of dirt or impurities into the thread area is prevented, which is necessary for screwing the clamping nut on the one hand and for screwing the adjusting nut on the other hand.

Finally, according to a further aspect invention, a spring damper device is also provided, which has a main spring and a tubular body and a damping device arranged within the tubular body with means for influencing the flow of a damping fluid between two fluid chambers formed in the tubular body, the spring damper device having a pneumatically operable adjusting device as explained above.

Figure 6:
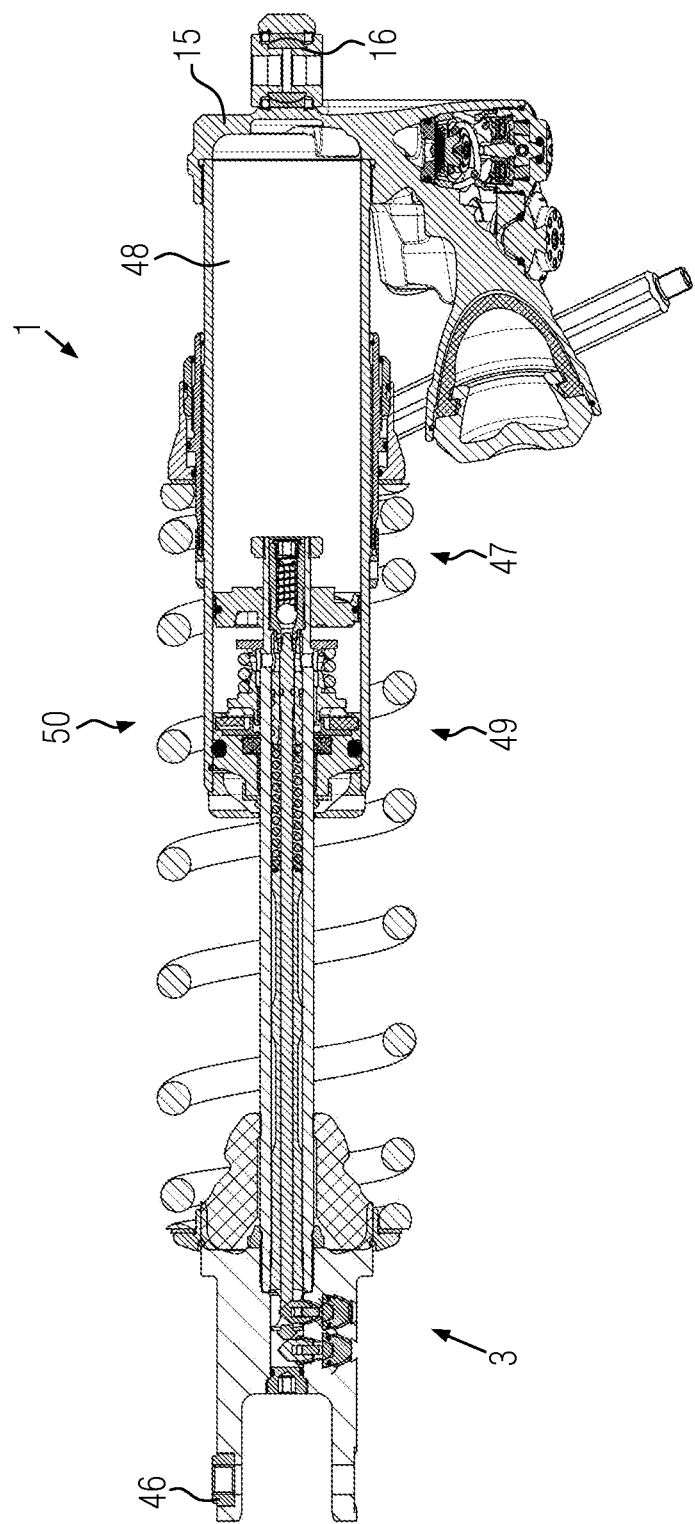
FIG. 6 is a sectional view of a suspension strut of a motorcycle with an adjusting device thereon according to the second embodiment.

Attention is invited to FIG. 1, showing a sectional view of a first embodiment of the pneumatically operated adjusting device 1 according to the present invention. This embodiment of the adjusting device 1 can be mounted on a damper device tube body 2 of a spring damper device 3, which damper device 3 is depicted in FIG. 6 of the drawing. As can be seen in FIG. 1, the adjusting device 1 has a tubular or tubular piece-shaped housing 4 which surrounds the damper device tube body 2. The main spring device 5, which serves as the main spring of the spring damper device 3, rests against the tubular housing 4. The wall of the housing 4 has a passage 6 defined therein, through which a pressurized fluid in the form of air, for example, can be introduced into an inner recess 7 of the housing 4. The inner recess 7 serves also as a pressure chamber 8.

The adjusting device 1 also has an adjusting nut 9 with an internal thread 10. The adjusting nut's female internal thread 10 is in screw engagement with an external thread 11 on the outside of the tube body 2 of the spring damper device 3, as seen in FIG. 1. As will be further explained below, the external thread 11 can generally be provided on a tubular piece-shaped body, i.e. alternatively on a sleeve-shaped body which is intended to receive the tube body 2 of the spring damper device 3, and which serves as an intermediate sleeve or adapter sleeve, so that the adjusting device can be adapted or used as a retrofittable after-market component.

As can also be seen from FIG. 1, the housing 4 rests, via a conical shoulder 12 thereof, against a complementary conical shoulder 13 of the adjusting nut 9. Accordingly, in the operating position shown in FIG. 1, which is established during normal driving of a vehicle (e.g. a motorcycle) having a spring damper equipped with an adjusting device 1, a compressive force is transmitted from the spring 5 to the housing 4. Such compressive force is transmitted via the spring washer 14 provided as an intermediate ring into the housing 4, which is supported via the conical housing shoulder 12 on the conical shoulder 13 of the adjusting nut. The intermediate washer 14 transmits the force to the abutment surface 54 formed on the housing 4, via which the spring force is imparted to the housing 4.

Because the adjusting nut 9 is supported, via its internal thread 10, on the external thread 11 of the tube body 2, the spring force generated by the spring 5 is ultimately introduced into the tube body 2. The tube body 2 is supported on the frame of the unspecified motorcycle via the shock absorber housing 15, which absorber housing can be seen in more detail in FIG. 6, and the shock absorber eye 16 located on it.

If the rider of the motorcycle wishes to change the spring preload of the spring 5, the preload can be adjusted by means of the axial adjustment of the adjusting nut 9 on the tube body 2. The rider can connect an external pump (not shown in detail, but in the form of, for example, a conventional air pump for a bicycle or a pump belonging to the on-board tool kit of the vehicle) to the valve body 17 of the adjusting device 1 of FIG. 1. By the pump actuation, compressed air is introduced into the inner recess 7 via the passage 6, so that a pressure level or internal pressure, which can be regulated by actuating the pump, is set in the pressure chamber 8 defined by the inner recess. As seen in FIG. 1, the pressure chamber 8 is closed off in the drawing plane in an upward direction by a sealing ring 19 configured as an annular body 18. The annular body 18 has U-shaped circumferential grooves 20, 21 defined therein on both the inner and outer circumferences thereof, which are formed to accommodate the respective sealing devices 22, 23. The inner sealing device 22 arranged in the groove 20 is supported on the outer circumference of the damper device tube body 2, while the outer sealing device 23 arranged in the groove 21 is supported on the inner circumference of the inner recess 7 of the housing 4. The annular body 18 is supported on the external thread 11 of the tube body 2 (or a shoulder formed there), so that the pressure chamber 8 is sealed off from the external thread 11 and is closed off in a radially inward direction from the outer circumference of the tube body 2.

Referring still to FIG. 1, the inner recess 7 is defined in part by a pressure wall 24 extending radially inwards from the housing's cylinder segment-shaped wall area 25 to the outer circumference of the tube body 2 wall. The housing 4 has an internal circumferential groove 26 defined therein axially below the pressure wall 24. A sealing device in the form of an O-ring 27 is arranged in the circumferential groove 26, so that the pressure chamber 8 is formed between the sealing ring 19 (provided by the annular body 18), the wall area 25, and the pressure wall 24 as well as the tube body 2. An increase in the internal pressure in the pressure chamber 8 therefore leads to a resulting downward pressure force being applied to the pressure wall 24; this in turn leads to the pressure force being supported on the spring 5, which is displaced axially in the direction of the directional arrow P in the drawing plane. Thus, with the pressure force applied via the increase in the internal pressure in the pressure chamber 8, i.e. the spring 5 is more strongly compressed.

The compression of the spring 5 results in the conical shoulder 12 of the housing 4 detaching, or no longer having contact with, the conical shoulder 13 of the adjusting nut 9; as a result, the adjusting nut 9 therefore no longer is subjected to the spring force of the spring 5. In this condition, the adjusting nut 9 with its internal thread 10 has screwed engagement with the external thread 11 free of pressure from the spring 5; it thus may easily be screwed further downwards in the direction of the arrow P, or screwed further upwards opposite the direction of the arrow P. By further increasing the internal pressure in the pressure chamber 8, the spring 5 is further compressed and the housing 4 is displaced further downwards in the direction of the arrow P by the pressure force imparted on the pressure wall 24.

Figure 4:
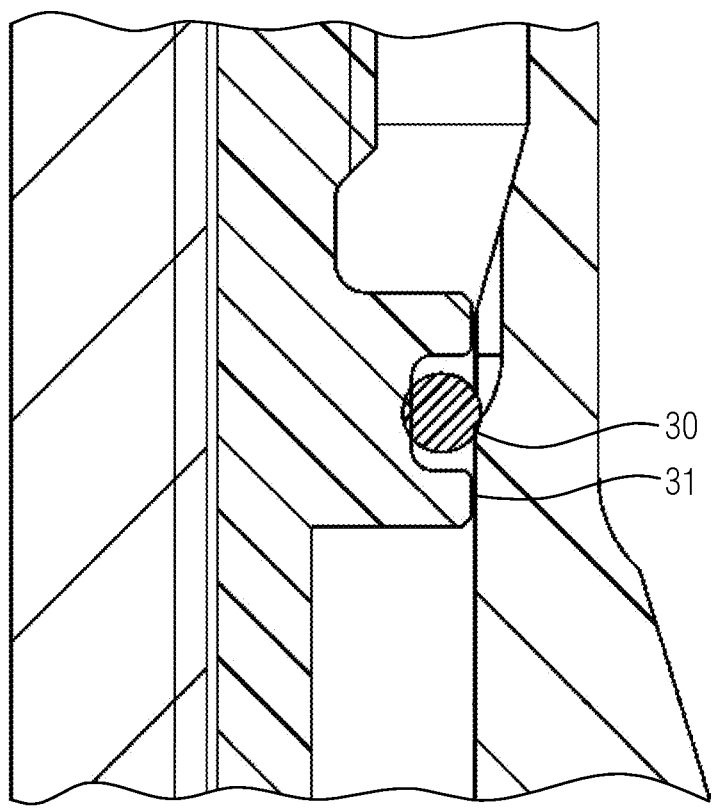
FIG. 4 an enlarged view of the section "A" according to FIG. 3.

Combined reference is made to FIG. 1 and FIG. 4. The housing 4 is provided in the area of the inner circumference with an expansion device 29 configured as a venting slot 28. Further pressurization of chamber 8 with compressed air leads to a further axial displacement of the housing 4 in the direction of the arrow P until the pressure in FIG. 4 is set, at which position the lower edge area 30 of the venting slot 28 reaches the outer sealing device 23. With any further increase of the internal pressure in the pressure chamber 8, the edge area 30 passes the sealing device 23 until the internal pressure in the pressure chamber 8 is reduced so far by an escape of compressed air through the annular gap 31 and the venting slot 28. As a result of the new equilibrium of forces now established between the pressure force built up by means of the pressure wall 24 and the spring force of the spring 5, the housing 4 has again been displaced upwards, in a direction opposite to arrow P in FIG. 1, to such an extent that the lower edge area 30 of the vent slot 28 again seals against the sealing device 23; further escape of compressed air from the pressure chamber 8 is thereby is prevented. In this manner, a stroke limiting device is obtained, and it is ensured that only a predetermined displacement path of the housing 4 relative to the tube body 2 is possible—preventing faulty operation of the adjustment device 1.

Figure 5:
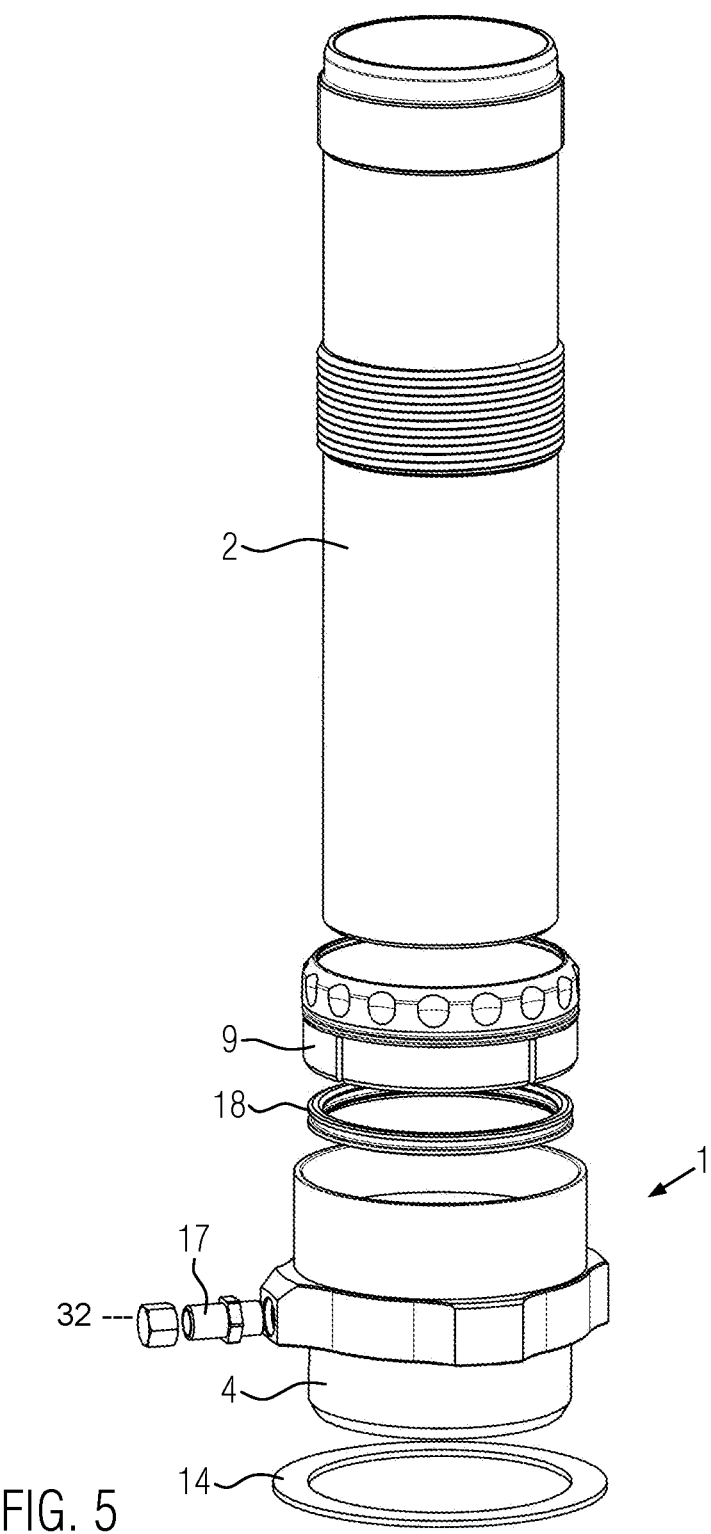
FIG. 5 is a perspective exploded view of a tubular body of a shock absorber of a motorcycle with an adjusting device arranged thereon according to the first embodiment.

FIG. 5 shows an exploded view of the adjusting device 1. The adjusting device 1 can be disposed on the spring damper device 3, which has a tube body 2 or tubular piece-shaped body, and is closer to FIG. 6, so that air under pressure can be introduced into the pressure chamber 8 via the valve body 17, on which a valve cap 32 is detachably mounted (FIG. 5), in order to compress the spring 5 and thus ensure that the adjusting nut 9 can be screwably moved relative to the tube body 2 without much effort. An upper sealing device 33 (FIG. 1) provided on the inner circumference of the adjusting nut 9, which is supported on the outer circumference of the tube body 2, prevents dirt from entering into the area of the threads 10, 11, and thus also prevents dirt and debris from getting into the area of the screwed engagement of the two threads.

If the user of the adjusting device 1 has brought about the desired re-adjustment of the spring preload by screwing the adjusting nut on the tube body in an appropriate upward or downward direction, the pressure chamber 8 can be relieved, for example by operating a relief valve on the pump not shown in detail, in order to relieve the pressurized air from the pressure chamber 8, so that the spring force applied by the spring 5 causes the housing 4 to be displaced again in the direction of the adjusting nut 9 until the shoulder 12 on the housing comes into contact with the shoulder 13 of the adjusting nut; in this way the operating position of the adjusting device 1 is obtained for normal driving operation of the vehicle equipped with the adjusting device.

In the following, a second or modified embodiment of the adjusting device is described in more detail on the basis of FIG. 2, which shows the adjusting device 1 in a driving position in which the force of the spring 5 is supported by the tube body 2. The tube body 2 of the spring damper device 3 is surrounded by the spring 5, which rests on the spring washer or intermediate washer 14 which transmits the spring force to the housing 4 of the adjusting device 1. In the driving position, the housing 4 is supported, by its conical shoulder 12, on the conical shoulder 13 of the adjusting nut 9. This alternative embodiment of the adjusting device 1 also has a vent slot 28, the function of which corresponds to the function of vent slot 28 explained above with reference to the embodiment according to FIG. 1.

The pressure chamber 8 is also defined by the inner recess 7 in this embedment. But, instead of the annular body 18 which closes the pressure chamber 8 in the upward direction in the embodiment of FIG. 1, in this alternative embodiment of the adjusting device 1 the pressure chamber 8 is sealed in the upward direction by a sealing device 34. The sealing device 34 is arranged in a U-shaped groove 35 of a tubular body 36. The secondary tubular body 36, serving as an intermediate or adapter sleeve, is provided as a retrofittable after-market component for forming the adjusting device 1 according to this disclosure.

Figure 2:
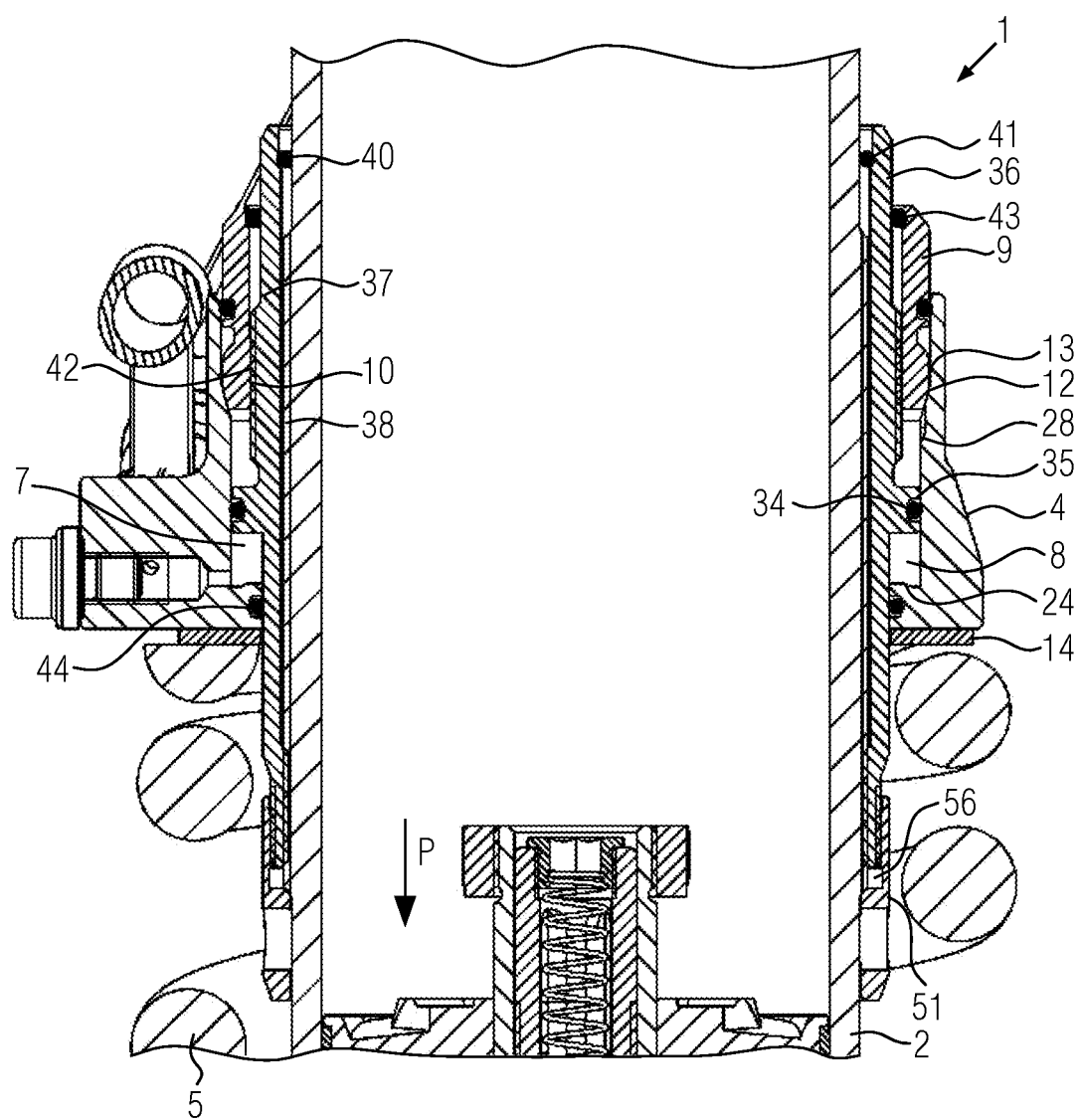
FIG. 2 is a sectional view of a second embodiment of an adjusting device according to the present invention, showing a position of the adjusting device in driving operation.

Continuing reference is made to FIG. 2. The tubular body 36, configured as an intermediate or adapter sleeve 37, has an internal thread on its inner circumferential surface 38, which is provided for screw engagement with an external thread 11 provided on the outer circumferential surface of the tube body 2. In this manner, the adapter sleeve 37 has screwed engagement with the tube body 2, can be used to retrofit the adjustment device 1 to any existing spring damper device 3 because it is only necessary to provide an internal thread on the adapter sleeve 37 which matches the external thread 11 of the tube body 2.

The adapter sleeve 37 has a sealing device 40 on its inner circumferential surface 38, which can be seen in FIG. 2, and which prevents dirt from entering the screw engagement between the external thread 11 of the tube body 2 and the internal thread of the adapter sleeve 37. The adapter sleeve 37 also has an external thread 42 on its outer circumferential surface 41, which is configured for screw engagement with the internal thread 10 provided on the adjusting nut 9. A sealing device 43 provided on the inner circumferential surface of the adjusting nut 9 prevents the penetration of dirt into the area of screwed engagement between the inner thread 10 of the adjusting nut 9 and the outer thread 42 of the adapter sleeve 37.

Pressurized air can be introduced, via the passage 7 of the housing 4, into the pressure chamber 8 of the second embodiment of the adjustment device of FIG. 2. The pressurized air is prevented from exiting the pressure chamber 8 by a sealing device 44 in the area of the inner circumferential surface 45, so that the pressurization of the pressure chamber 8 ensures that, via the pressure force acting on the pressure wall 24, the spring 5 in the drawing plane of FIG. 2 is shifted downwards in the direction of the arrow P. The downward shifting results that the conical shoulder 12 of the housing 4 is released from the conical shoulder 13 of the adjusting nut 9; the adjusting nut 9 thus can be screwed onto the adapter sleeve 37 with little effort, so that it assumes a higher or lower position as viewed in the direction of the arrow P, depending on the direction of the screwing movement.

If the internal pressure in pressure chamber 8 is reduced by operating the above mentioned relief device on the pump not shown in detail, the pressure force displacing the housing 4 in the downward direction drops, and the spring 5 again displaces the housing 4 relative to the adjusting nut 9 in the upward direction opposite the direction of the arrow P, until the conical shoulder 12 of the housing 4 again contacts the conical shoulder 13 of the adjusting nut 9; the spring force of the main spring 5 is ultimately supported on the tube body 2 via the threaded engagement between the adjusting nut 9 and the adapter sleeve 37, and the threaded engagement between the adapter sleeve 37 and the tube body 2.

Figure 3:
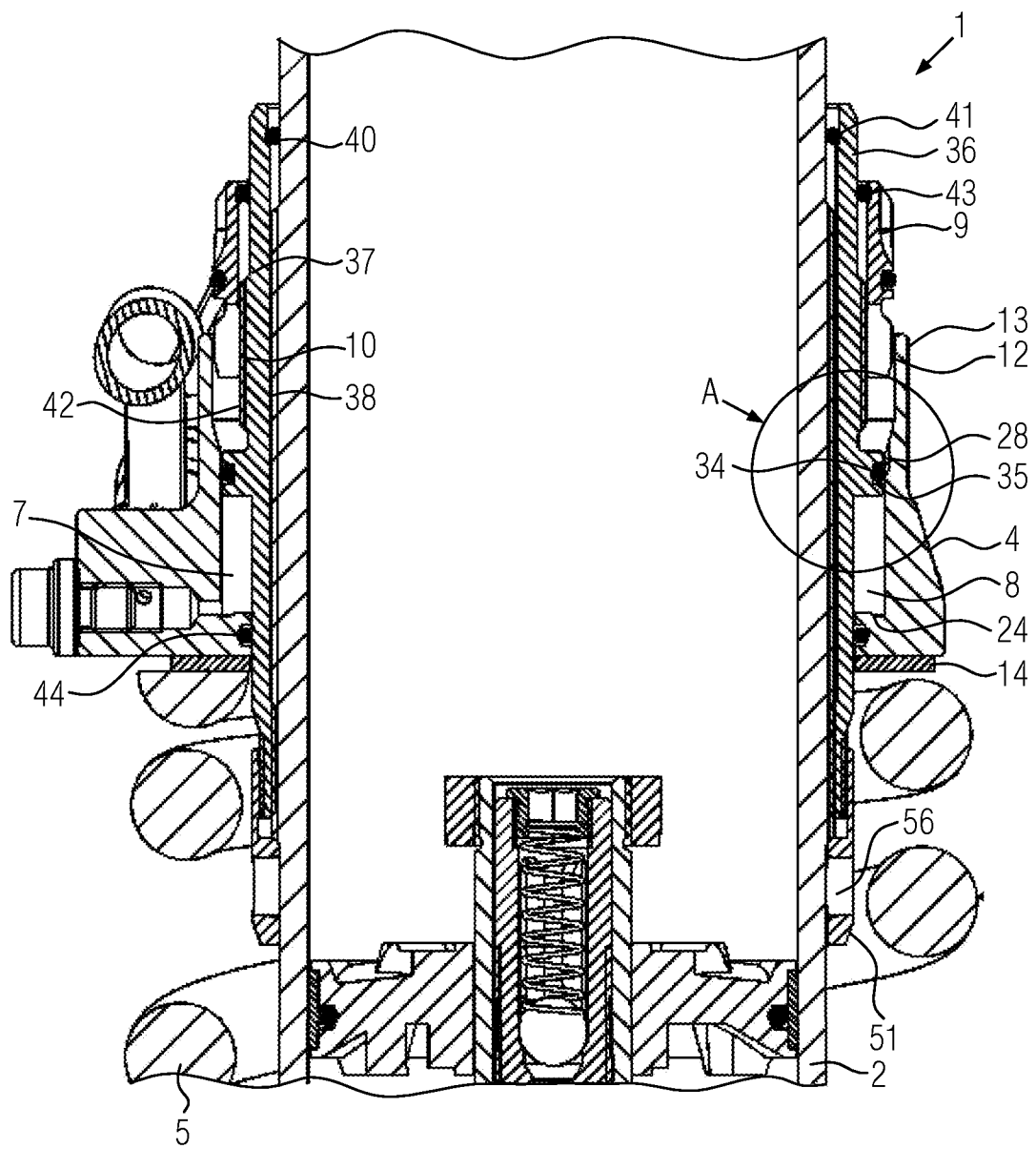
FIG. 3 is a view similar to that shown in FIG. 2, showing the adjusting device of the FIG. 2 embodiment in a position which is adjusted when the pressure chamber is pressurized with air to adjust the spring device.

A faulty operation of the adjusting device 1 is also prevented in this second embodiment by the fact that the expansion device in the form of the vent slot 28 is opened in the case of a corresponding axial displacement of the housing 4 in a downward direction. FIG. 3 illustrates the position of the adjusting device 1 in the adjustment mode, which enters the area of the sealing device 34 and a further increase of the internal pressure in the pressure chamber 8 ultimately results that pressurized air can escape from the pressure chamber 8 until the spring 5 has again displaced the housing 4 upwards against the direction of the arrow P so that the sealing device 34 again seals the pressure chamber 8 to prevent further escape of air from the pressure chamber 8.

A clamping nut 51 is provided at the lower end area of the adapter sleeve 37 (in the direction of the arrow P according to FIG. 2), with which the adapter sleeve 37 can be fixed releasably relative to the tube body 2 by means of a clamping engagement.

FIG. 6 shows a sectional view of a spring damper device 3 with an adjusting device 1 arranged thereon according to the second embodiment. The spring damper device 3 can be attached via the mounting 46, for example, to a rear swing arm of a motorcycle (not shown in detail), and via the upper shock absorber eye 16 to the frame of the motorcycle. The spring damper device 3 has in the interior 47 of the tube body 2 a first fluid chamber 48 and a second fluid chamber 49, each of which is adapted to receive a damping fluid (which is not shown in detail) and between which the damping fluid can be displaced via a damping device 50 provided with valve devices.

A procedure is described below, with combined reference to FIGS. 7-12, by which the main spring 5 can be easily released from the spring damper device 3 with the aid of the adjustment device 1, according to the invention. The procedure is explained with respect to second embodiment of the adjusting device 1.

Figure 7:
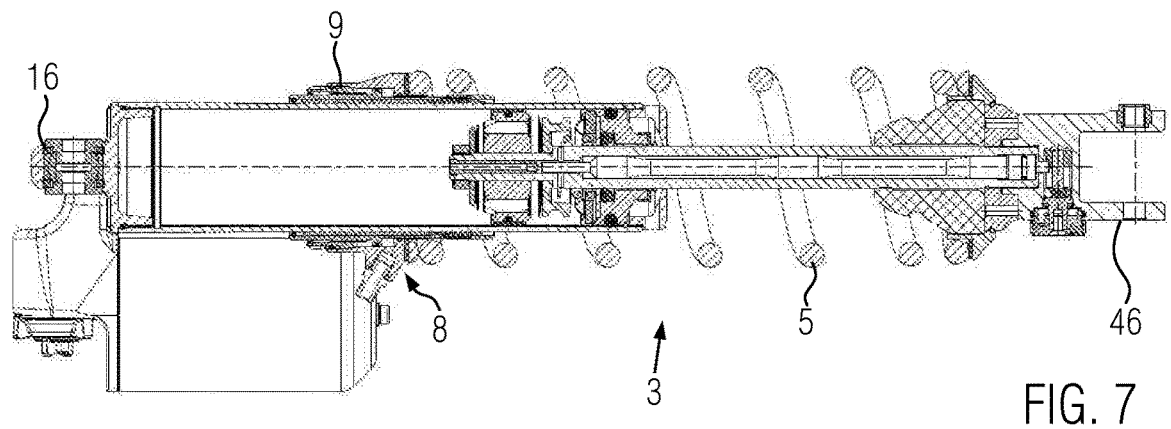
FIGS. 7 through FIG. 12 are sectional views of the suspension strut with the adjusting device according to the second embodiment, and considered collectively serve to explain the disassembly of the main spring of the suspension strut with the aid of the adjusting device according to the present invention.

FIGS. 7-12 may be considered serially to disclose further the function of an adjuster apparatus 1. FIG. 7 illustrates that by pressurizing the pressure chamber 8, the spring 5 has been compressed in the direction of the lower mounting 46; therefore, the adjusting nut 9 can be turned freely without undergoing axial pressure from the spring 5.

Figure 8:
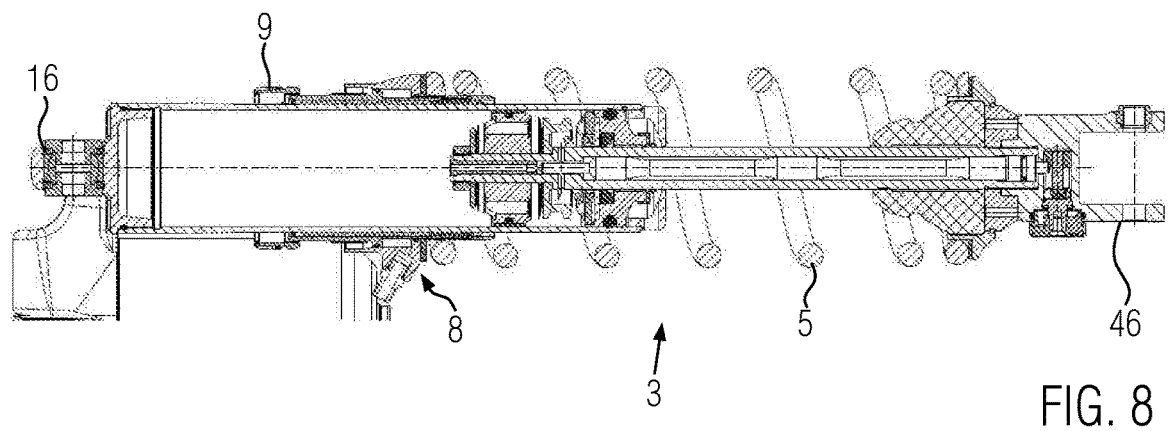

FIG. 8 shows that the adjusting nut 9 has been loosened from the screw engagement with the external thread 42 of the adapter sleeve 37 (see also FIG. 2), and has been displaced in the direction of the upper shock absorber eye 16.

Figure 9:
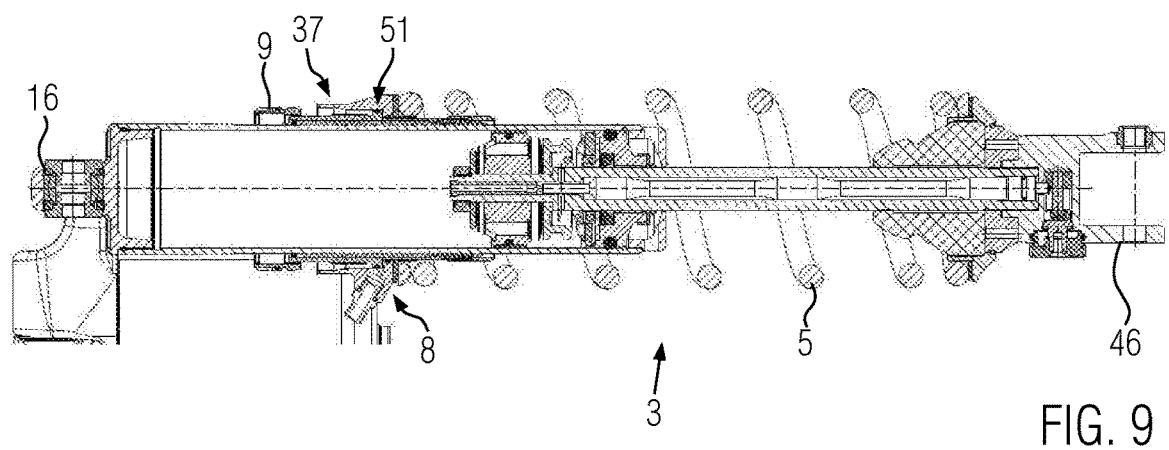
Figure 10:
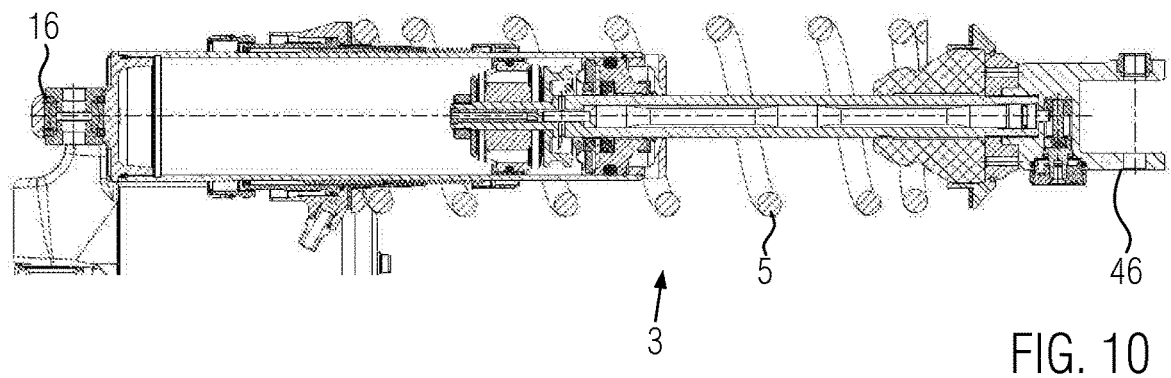

FIG. 9 illustrates that the pressurized air has been released from the pressure chamber 8, and the spring 5 has therefore already relaxed again. Now, the clamping nut 51 (also of FIG. 2) which fixes the adapter sleeve 37 detachably, can be loosened and the adapter sleeve 37 can be moved in the direction of the upper shock absorber eye 16, which results in spring 5 being exposed in the uncompressed state, as can be seen further in FIG. 10.

Figure 11:
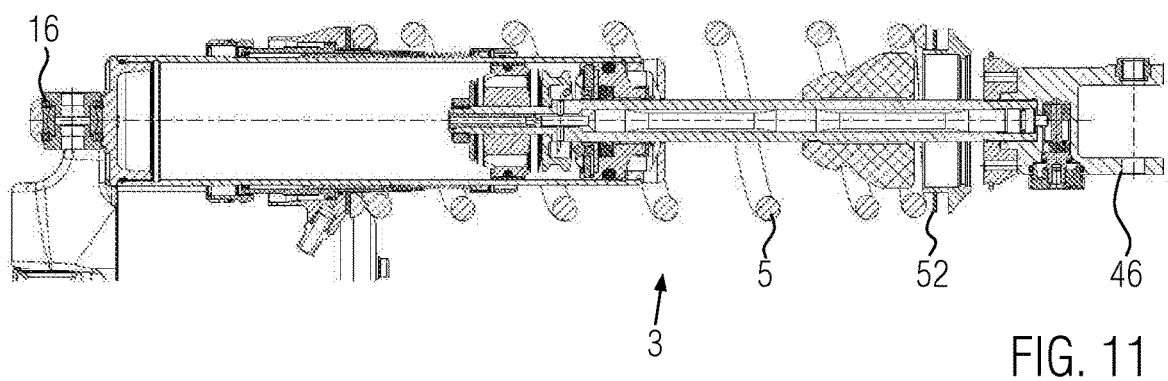
Figure 12:
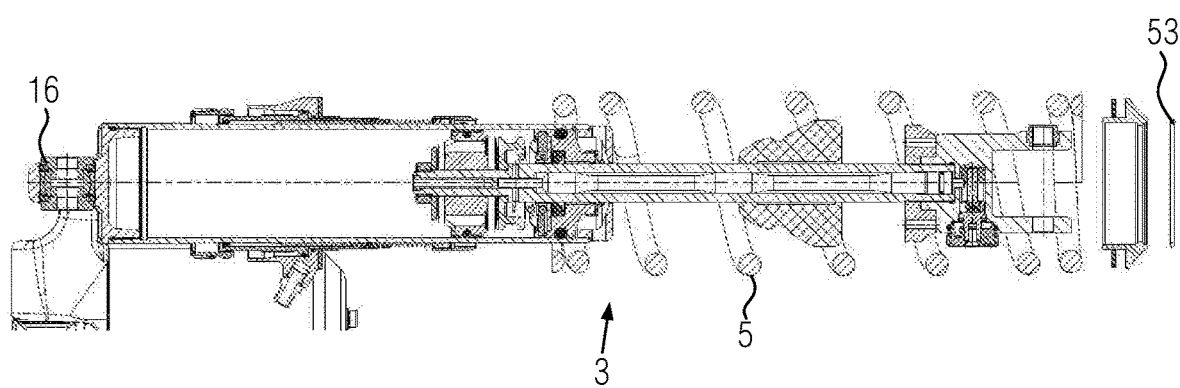

Referring to FIG. 11, it is possible in a next step to move the lower spring plate 52 slightly towards the upper shock absorber eye 16, so that a snap ring 53 holding the spring plate 52 can be released; the main spring 5 can be moved downwards from the spring damper device 3, i.e. towards the mounting 46, and removed from the spring damper device 3, as shown also in FIG. 12.

An advantage of the afore described adjusting device is that the adjusting nut can be relieved of the loading of the preloaded main spring by the pneumatic support of the displacement of the preloaded spring, and can therefore be adjusted easily, user-friendly and without any use of tools. That the present adjustment device is configured with the vent slot in such a way that a maximum adjustment path cannot be exceeded, supplies an adjustment device that prevents incorrect operation by the user.

By providing the sealing devices as described above, all moving parts and threads of the adjusting device are protected against contamination and the maintenance of functionality in normal driving operation is achieved and, in particular, that the threads always remain smooth. Also, that a secure transmission of force between the housing and the adjusting nut is achieved between these components by the formation of the conical shoulders means that it is unnecessary for the user to actively bring about the transmission of force; thus an apparatus is provided which can be operated by the user without error. The use of the clamping screw usually found in known systems for fixing the adjusting nut has been completely eliminated. Such a clamping screw often leads to the tube body of the spring damper device being deformed by accidental overtightening the clamping screw, which in turn leads to a change in the damping behavior of spring damper devices equipped with the known adjusting devices.

Due to the simple design of the present adjusting device, a weight-saving and space-saving embodiment has been created which, in contrast to known adjusting devices, does not require the provision of a piston, as was explained above. In addition, the adjustment device is also suitable for use on spring damper devices used on off-road motorcycles, so that the encapsulation of the moving components by the sealing devices described prevents the penetration of dirt. Still further, it is possible, using this adjustment device, to exchange the main spring of the spring damper devices provided with the adjustment device without the use of tools, for example to be able to attach a main spring with a desired different spring characteristic to the spring damper device.

With regard to features of the invention not explained in detail above, additional explicit reference is made to the claims and the drawing.

LIST OF REFERENCE SIGNS 1. adjusting device
2. tube body
3. spring damper device
4. housing
5. spring device, main spring
6. passage
7. inner recess
8. pressure chamber
9. adjusting nut
10. female thread
11. external thread 12. housing shoulder
13. nut shoulder
14. intermediate washer
15. shock absorber housing
16. strut eye
17. valve body
18. annular body
19. sealing ring
20. inner groove
21. outer groove
22. sealing device
23. sealing device
24. pressure wall
25. wall area
26. inner circumferential groove
27. sealing device
28. vent slot
29. decompression device
30. border area
31. annular gap
32. valve cap
33. sealing device
34. sealing device
35. groove
36. tubular body
37. adapter sleeve
38. inner circumferential surface
39. internal thread
40. sealing device
41. outer circumferential surface
42. external thread
43. sealing device
44. sealing device
45. inner circumferential surface
46. mounting
47. interior of tube body
48. fluid chamber
49. fluid chamber
50. damping device
51. clamping nut
52. spring plate
53. snap ring
54. abutment surface
55. sealing device
56. sealing device Although the invention has been described in detail with particular reference to the foregoing embodiments, other embodiments can achieve the same results. It is understood that the invention is capable of use in various other combinations and is capable of changes or modifications within the scope of the inventive concept as expressed herein. Modifications of the invention may be obvious to those skilled in the art, and it is intended to cover by the appended claims all such modifications and equivalents.

What is claimed is:

1. A pneumatically actuable adjusting device (1) for acting on a spring (5) of a spring damper device (3) having a tube body (2), the adjusting device comprising:
   a housing (4), surrounding the tubular tube body (2), comprising:
      a passage (6) passing through a peripheral wall of the housing (4);
      an abutment surface (54) for receiving a spring force from the spring;
      a conical shoulder (12) contactable with the adjusting nut (9), and the shoulder (12) imparts a radially inwardly acting clamping force on the adjusting nut (9) to releasably secure the adjusting nut to the tube body (2); and
   an adjusting nut (9) with an internal thread (10) which is screw engageable on an external thread (11) of a tubular body (2, 37) of the spring damper device (3);
   wherein the housing (4) is releasably abuttable on the adjusting nut (9), and comprises an inner recess (7) defining a pressure chamber (8) in fluid communication with the passage (6), and wherein the inner recess (7) has a pressure wall (24), whereby pressurization of the pressure chamber (8) imparts a force upon the housing (4) in an axial longitudinal direction.

2. The pneumatically actuable adjusting device (1) according to claim 1 wherein the housing (4) is axially displaceable on the tube body (2) against the spring force of the spring (5).

3. The pneumatically actuable adjusting device (1) according to claim 2, further comprising:
   means (19, 22, 23, 24, 27, 34) for at least partially forming the pressure chamber (8) having the pressure wall (24); and
   an adapter sleeve (37) surrounding the tube body (2) between the tube body and the housing (4).

4. The pneumatically actuable adjusting device according to claim 3 wherein the housing (4) comprises:
   a U-shaped groove, in a vicinity of the pressure wall (24), for receiving a sealing device (44) supported on a portion of the adapter sleeve (37) lacking an external thread; and
   another sealing device (34), spaced-apart axially from the U-shaped groove, supported on an outer circumferential region of the adapter sleeve (37); and
   wherein the pressure chamber (8) is formed between the housing (4), the sealing devices (34, 44), and the adapter sleeve (37).

5. The pneumatically actuable adjusting device (1) according to claim 3 wherein the adapter sleeve (37) comprises an internal thread (39), along at least a portion of its longitudinal extent, releasably engageable with the external thread (11) of the tube body (2), and further comprising a clamping nut (51) releasably engageable with the adapter sleeve (37) for its releasable axial and rotationally fixed arrangement on the tube body (2) of the spring damper device (3).

6. The pneumatically actuable adjusting device according to claim 5, further comprising:
   a sealing device (40) between the adapter sleeve (37) and the tube body (2); and
   a sealing device (56) between the clamping nut (51) and the housing (4).

7. A spring damper device (3) with a spring (5), a tube body (2), and a damping device (50) arranged inside the tube body (2) with means for influencing the flow of a damping fluid between two fluid chambers (48, 49) formed in the tube body (2), and further comprising a pneumatically actuable adjusting device (1) according to claim 2.

8. The pneumatically actuable adjusting device (1) according to claim 1, further comprising a spring washer (14), in contact with the abutment surface (54), comprising a surface subjected to the spring force of the spring (5).

9. The pneumatically actuable adjusting device (1) according to claim 1 wherein the housing (4) comprises at least one expansion device (28, 29) adapted to be brought into fluid communication with the pressure chamber (8) by a displacement of the housing (4) relative to the tube body (2).

10. The pneumatically actuable adjusting device (1) according to claim 1, further comprising an annular body (18, 19), surrounding the tube body (2), and comprising a substantially U-shaped groove (20, 21) in its inner circumference or its outer circumference for receiving sealing devices (22, 23); and wherein the annular body (18, 19), an inner circumferential wall of the housing (4), the pressure wall (24), and an outer circumferential wall of the tube body (2) at least partially define the pressure chamber (8).

11. The pneumatically actuable adjusting device (1) according to claim 1, further comprising:
- a sealing device (55) between the housing (4) and the adjusting nut (9); and
- a sealing device (33) between the adjusting nut (9) and the tube body (2).

* * * * *